United States Patent Office

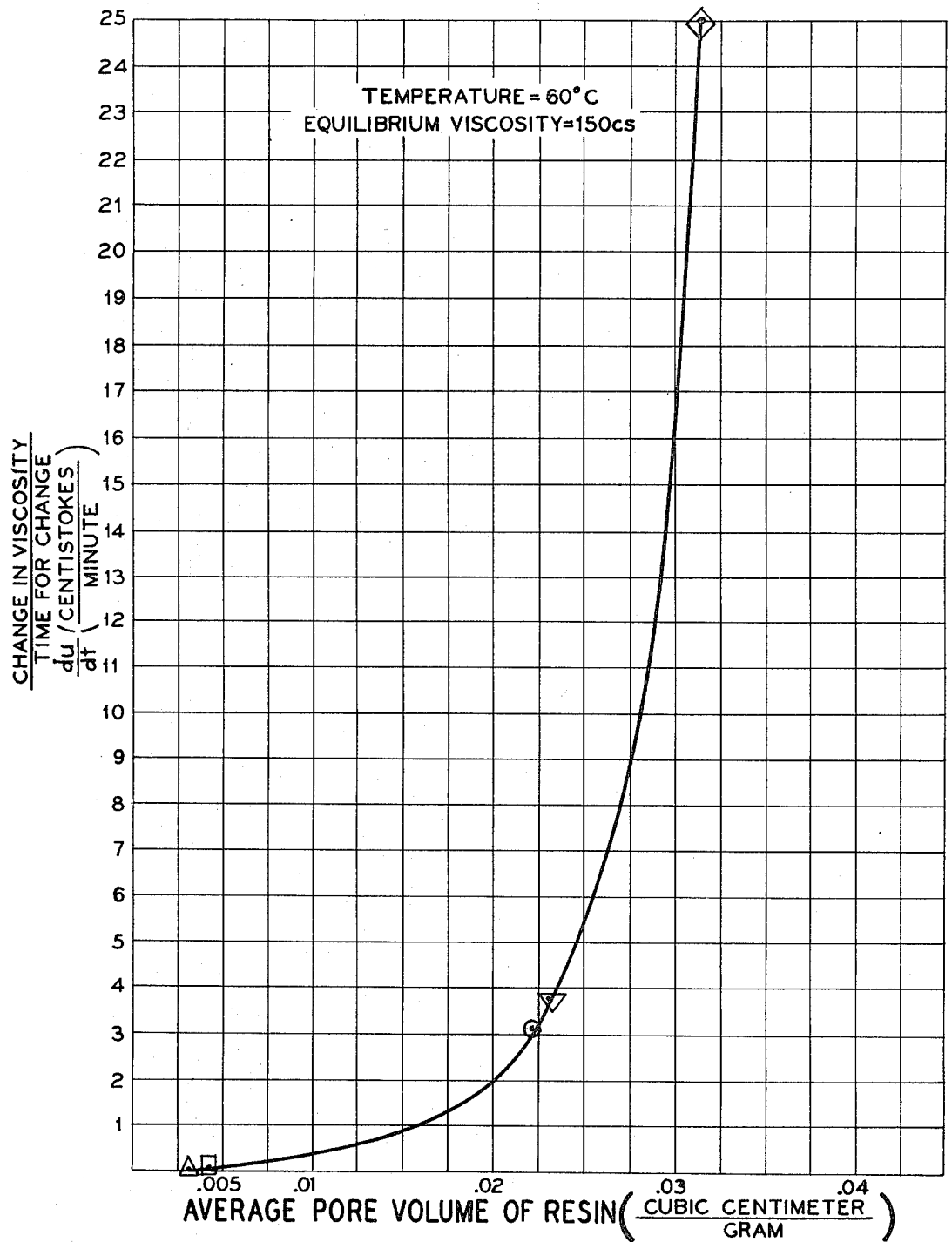

3,694,405
Patented Sept. 26, 1972

---

3,694,405
REARRANGEMENT OF ORGANOSILOXANES USING MACRORETICULAR SULFONIC ACID CATION EXCHANGE RESIN
Carl James Litteral, Newport, Ohio, assignor to Union Carbide Corporation, New York, N.Y.
Filed Oct. 21, 1970, Ser. No. 82,721
Int. Cl. C08f 11/04
U.S. Cl. 260—46.5 R          17 Claims

ABSTRACT OF THE DISCLOSURE

This invention relates to a process for the siloxane bond rearrangement of organosiloxanes to form restructured organosiloxanes by flowing organosiloxanes through a packed bed of macroreticular sulfonic acid cation exchange resin having a specific pore volume of at least 0.01 cc./gm., removing the effluent organosiloxanes having restructured siloxane bond arrangements with attendant molecular weight changes and thereafter recovering the restructured organosiloxanes. The restructured organosiloxanes may range from cyclic to linear structures in a wide range of molecular weights. This invention also relates to a continuous process for the preparation of restructured organosiloxanes as aforesaid in which the organosiloxane effluent is fractionated to recover a desired boiling range product and undesired fractions are recycled into the process. The product organosiloxanes may range from volatiles to oils to gums to nonflowing polymers and are useful as chemical intermediates, coatings, and treating agents.

---

This invention is directed to a process for the preparation of a wide range of organopolysiloxanes by siloxane rearrangement employing a packed bed of a macroreticular sulfonic acid cation exchange resin having a specific pore volume of at least about 0.01 cc. per gram. One aspect of this invention relates to rearrangement or specifically, equilibration of low molecular weight organopolysiloxanes to form higher molecular weight organopolysiloxanes, such as, oils, resins, and gums, by flowing said low molecular weight organosiloxanes through a packed bed of a macroreticular sulfonic acid cation exchange resin having a specific pore volume of at least about 0.01 cc./gm. Another aspect of this invention is the rearrangement of high molecular weight organopolysiloxanes, for example solvated gums, solvated resins, oils, greases, gels, and the like, to lower molecular weight cyclic and linear organosiloxanes, such as volatiles, oils, and the like, by flowing solvated high molecular organopolysiloxanes through said macroreticular sulfonic acid cation exchange resin bed.

More specifically this invention relates to a continuous process for the rearrangement of solvated organopolysiloxanes which comprises reacting organopolysiloxanes as aforedescribed, removing the solvated restructured organopolysiloxanes from the ion exchange resin, separating the product to recover the desired boiling range product, and continuously recycling the undesired fractions into the process.

More specifically the invention also relates to the aforedescribed process wherein the organosiloxane effluent is in a state of chemical bond equilibrium.

It is known that organopolysiloxanes can be prepared by rearrangement reaction in which the silicon to oxygen to silicon linkages are rearranged in a virtually random fashion. Rearrangement reactions of organopolysiloxanes are catalyzed by strong bases and strong acids. Strong acid and strong base catalyzed siloxane rearrangements are frequently used in the commercial preparation of higher molecular weight organopolysiloxanes from lower molecular weight organosiloxanes and vice versa.

The catalysts heretofore employed include strong bases, such as the alkali metal bases (e.g. lithium oxide, sodium hydroxide, potassium alkoxides, potassium silanolates, cesium hydroxide and so forth), the quaternary bases such as tetra-alkyl ammonium hydroxide and alkoxide and tetra-alkylphosphonium hydroxide and alkoxide, and the like, and strong acids such as Lewis acid complexes, hydrogen halides, sulfuric acid, boric acid, trifluoromethyl sulfonic acid, and the like. Also taught to be of use as a siloxane bond rearrangement catalyst were certain supported acids, such as acid treated carbon, acid treated silicates, acid treated clays and synthetic "gel type" cation exchange resins.

Each of the catalysts hereinbefore discussed presents a process limitation which is unexpectedly avoided when employing the specific macroreticulated ion exchange resin catalyst as taught herein. For example the alkali metal bases require temperatures in excess of 100° C. and the quaternary bases are operated at temperatures in excess of about 90° C. At these high catalysis temperatures, the carbon to silicon bond is cleaved with a number of organosilicon compounds thereby causing undesirable side reactions. In addition the high catalysis temperatures necessitated sophisticated high pressure vessels to contain cyclic volatiles having high vapor pressures. The use of acid catalysts offered minimal improvement for the siloxane rearrangement, with the exception of ferric chloride-hydrogen chloride complexes and sulfuric acid, both of which permitted siloxane rearrangement below 100° C. However it became readily apparent that the presence of such acid catalysts necessitated chemical neutralization of the effluent, further necessitating other processes and operations to separate the effluent from the catalyst and reagent. In addition sulfuric acid is required in concentrations as high as 2 parts per 100 parts of siloxane.

In the case of the supported acid catalysts, that is catalysts which are physically incorporated into at least the surface of a carrier particle, the catalyst can be separated from the effluent and the recovered catalyst particles can then be regenerated for subsequent use. The support media for the acids varied in particle size and it has been stated that by decreasing the particle size one could increase the rate of rearrangement. Small particle media, such as clays, are impractical insofar as the catalyst bed pressure drop is too high for commercial considerations. Using fine media particles also increased the extent of catalyst entrainment in the effluent and this in turn necessitated an additional separation step.

There is described in U.S. Pat. No. 2,831,008, patented Apr. 15, 1958 (hereinafter termed the "Knopf patent") a process for preparing certain silicone oils by reacting a cyclic siloxane with a compound containing monofunctional silyl groups in the presence of a dilute acid treated, fine dispersion, solid cation exchange resin.

The Knopf patent discloses the use of fine-grained, dilute acid treated cation exchange media, such as carbon, kaolin, montmorillonite/quartz, charcoal, bleaching earth and a gel-type synthetic resin.

There is shown hereinafter by Examples 1 and 2 a comparison of the effectiveness of a macroreticular sulfonic acid cation exchange resin versus the ineffectiveness of gel type sulfonic acid ion exchange resins under the same reaction conditions. The reaction conditions of Examples 1 and 2 are moderate compared with high temperature (i.e. 100° C. to 200° C.), protracted reaction periods (i.e. 4 to 9 hours) of the Knopf patent. In addition, the effluent of the instant process is effectively resin-free whereas the fine-dispersion resins of the Knopf patent are readily entrained in the product oil necessitating a refined filtration operation.

U.S. Pat. No. 3,322,722, patented May 30, 1967, (hereinafter called the "Eynon patent") discloses siloxane-alkoxy/acyloxy interchange by batch reaction using strong acid catalysts. The patent equates known strong acids such as sulfuric acid with a sulfonated macroreticular cation exchange resin (Amberlyst 15).

Furthermore the siloxane-alkoxy/acyloxy interchange process using a sulfonated resin of the Eynon patent occurs during periods from about 12 to 60 hours at temperatures of 20° to 100° C.

Example 13 herein compares siloxanes-alkoxy ester interchange employing a packed bed system as disclosed herein with a batch reaction as disclosed in the Eynon patent. As shown the batch residence period is greater than 11.25 hours at 80–90° C. while the packed bed residence period is only 14 minutes at 27° C. to achieve the same degree of interchange; a most unexpected reduction.

It was found that by flowing organosiloxanes through a packed bed of a macroreticular resin having a pore volume of greater than 0.01 cc./gm., rearrangement would occur at an exceedingly rapid rate of moderate temperatures. In many cases equilibrium was achievable in a period of less than one hour at a temperature less than 100° C. with low molecular weight feed siloxanes.

While many resins have previously been adapted for packed bed process it was unexpected to find so dramatic an increase in reaction rate. Prior art equilibrium periods of 12 to 60 hours at temperatures of 80° to 100° C. were drastically reduced to 30 minutes or less at 60° C. In actual commercial practice, insofar as the desired effluent may be a non-equilibrium mixture the residence time would then generally be in order of magnitude of only several minutes. Therefore this invention has distinct commercial possibilities whereas prior art processes present significant commercial limitations.

The terms "macroreticular" and "macroreticulated" as used hereinbefore and hereinafter in the specification, examples and in the claims refer to a porous microspherical structure. This specific structure is defined in U.S. 3,037,052 and for adequate disclosure of this invention, descriptive matter of said patent relating to the macroreticular structure is incorporated herein by reference.

Briefly, the expression "resin having a macroreticular structure" or more shortly "macroreticular resin" as used throughout this specification refers to a resin possessing a network of microscopic channels and which is obtained by a special polymerization technique. This special polymerization technique involves polymerizing the monomer mixture in the presence of a precipitant which is a liquid (a) which acts as a solvent for the monomer mixture and is chemically inert under the polymerization conditions and (b) which is present in such amount and which exerts so little solvating action on the cross-linked copolymer product that phase separation of the latter takes place as evidenced by the fact that copolymer product is opaque when associated with a fluid having a different refractive index.

The cation exchange resin is the nuclear sulfonic acid type. These resins can be prepared, for example, by sulfonating a reticulate copolymer of styrene and a polyvinylidene monomer, such as divinylbenzene, trivinylbenzene, as well as polyvinyl ethers of polyhydric alcohols, such as divinyloxyethane and trivinyloxypropane, and the like. The sulfonating agent may be concentrated sulfuric acid, oleum, sulfur trioxide or chlorosulfonic acid.

Not all macroreticular sulfonic acid cation exchange resins are found to be suitable pursuant to this invention. It was determined that only those macroreticular sulfonic acid cation exchange resins having a specific pore volume of at least about 0.01 cc./gm. and preferably in excess of 0.03 cc./gm. would be suitable in the practice of this invention. Below is a tabular compilation of several macroreticular resins and their corresponding specific pore volumes as determined by mercury intrusion porosimetry (also shown is a gel-type):

| Macroreticular resin | Average pore volume (cc./gm.) |
|---|---|
| Amberlite–200 [1] | 0.0213 |
| Amberlite–252 [1] | 0.0041 |
| Amberlite–IR–120 [1] (gel-type) | 0.0033 |
| Amberlyst–15 [1] | 0.0325 |
| Dowex–70 [2] | 0.0231 |

[1] A trademark of Rohm & Haas Co., Philadelphia, Pa.
[2] A trademark of Dow Chemical Co., Midland, Mich.

Each of the above-tabulated macroreticular resins was employed in a siloxane rearrangement at 60° C. employing a standard feed mixture as follows:

(a) A mixture of dimethylsiloxane cyclics (1960 g.) and hexamethyldisiloxane (40 g.) (2.4 centistokes at 25° C.) was passed through a 1 cm. diameter column containing a dry sulfonic acid cation exchange resin (62 cc.) having an average internal pore volume of 0.0325 cc./g. (Rohm and Haas Amberlyst 15) at 60° C. Viscosity (at 25° C) of a sample taken at 8 minutes residence in the column had increased to 120 centistokes.

(b) A second aliquot of the above feed was passed through a bed of a dry sulfonic acid cation exchange resin having an average internal pore volume of 0.0231 cc./g. (Dow Chemical Dowex 70 H+ form) under conditions of experiment (a). Viscosity (at 25° C.) reached 97 centistokes at 26 minutes residence time.

(c) A third aliquot of the above feed mix was passed through a bed of a dry sulfonic acid cation exchange resin having an average internal pore volume of 0.0213 cc./g. (Rohm and Haas Amberlite 200) under conditions of experiment (a). Viscosity (at 25° C.) reached 94 centistokes at 30 minutes residence time.

(d) A fourth aliquot of the above feed mix was passed through a bed of a dry sulfonic acid cation exchange resin having an average internal pore volume of 0.0041 cc./g. (Rohm and Haas Amberlite 252) under conditions of experiment (a). Viscosity (25° C.) reached only 2.7 centistokes at a residence time of 90 minutes.

The rates of rearrangement as measured by change in viscosity per unit change in time for each of the above-mentioned resins were determined as measured by the slope ($d\mu/dt$) of a viscosity-time plot. The measured rates of rearrangement were then plotted as a function of the specific pore volume for the several resins as is shown in FIG. 1. The code symbols of FIG. 1 represent the performance of the following resins:

| Resin: | Symbol (FIG. 1) |
|---|---|
| Amberlite–200 | ⊙ |
| Amberlite–252 | ▪ |
| Amberlite–IR–120 (gel-type) | △ |
| Amberlyst–15 | ◇ |
| Dowex–70 | ▽ |

As can be seen, resins with pore volumes of less than about 0.005 cc./gm. showed no viscosity change and therefore no rearrangement period, while resins having pore volumes in excess of about 0.01 cc./gm. showed measurable degrees of rearrangement. The greater the pore volume the greater the degree of siloxane rearrangement. Macroreticular resins with specific pore volumes in excess of 0.03 cc./gm. are most suitable for commercial scale operations.

There is described herein a most advantageous process for effecting siloxane rearrangement employing the aforementioned macroreticulated ion exchange resins. Further, this process is commercially practical because it achieves a high-rate of siloxane rearrangement at moderate temperatures, pressures, and reaction periods. In fact this process effects a high rate of rearrangement at temperatures below 100° C. while providing contaminant-free restructured organopolysiloxane product.

The high rates of rearrangement achievable in the practice of this invention are measured by the residence time, that is the time the organosiloxane is in contact with the resin. In a continuous one-pass resin pack bed residence time is computed as follows:

$$\text{Residence Time} = \frac{\text{Organosiloxane Volumetric feed rate (cc./min.)}}{\text{Packed bed volume (cc.)}}$$

Other bed configurations, such as fluidized beds, batch reactors, recycled packed beds will of course have a modified equation. For example in a batch reactor the residence time equals the reaction period.

As stated equilibrium is of course understood to mean chemical bond equilibrium, the point at which rearrangement of species is equally favored. In equilibration rearrangements, as a practical matter, equilibrium is measured as the terminal viscosity point, since this is the point approaching equilibration where further viscosity change is too slow to be measureable. This point is determined on a viscosity vs. time plot as the asymptote viscosity. The equilibrium residence period is then the time required to reach equilibrium or the terminal viscosity.

Example 4 herein, indicates that a mixture of predominantly cyclic siloxanes undergoes equilibration as disclosed herein results in an equilibrium residence period of 65 minutes at 60° C.

Example 2 herein, indicates that a mixture of cyclic siloxanes and hexamethyl disiloxane undergoes rearrangement achieve an equilibrium residence time of about 10 minutes at 41° C.

Example 15 herein, indicates that low molecular weight silicone fluids containing beta-phenyl propyl siloxanes undergoes rearrangement in about 5.5 hours at 25° C.

As can be seen organosiloxanes containing lower alkyl radical species have extremely short equilibrium residence periods whereas those having pendant aromatic radical species such as phenyl ethyl have considerably longer equilibrium residence periods. This is believed to be because of steric interference caused by the pendant aromatic groups during rearrangement in the microscopic pores of the macroreticulated resin structure.

Organosiloxanes containing only alkyl groups of from 1–5 carbon atoms rearrange to equilibrium in periods of less than about 2 hours at 60° C., while those containing only alkyl groups of from 1–3 carbon atoms rearrange to equilibrium in periods of less than 1 hour at 60° C.

Organosiloxanes containing aromatic groups of from 1–18 carbon atoms rearrange to equilibrium in periods of less than about 5 hours at 60° C.

This invention is not limited to any particular class of organopolysiloxanes and is in fact applicable to all organosiloxanes wherein the organosiloxanes are a mixture of or a member of the class containing at least one structure having the formula:

$$(Y)_a SiO_{\frac{4-a}{2}} \qquad (I)$$

wherein Y is hydrogen, a substituted or unsubstituted monovalent hydrocarbon group or a divalent hydrocarbon group and $a$ has a value of from 1 to 3 inclusive. Preferably, Y contains from one to about thirty carbon atoms. The groups represented by Y can be the same or different in any given siloxane unit.

Illustrative of the unsubstituted monovalent hydrocarbon groups that are represented by Y in Formula I are the alkenyl (e.g. vinyl and the allyl and the like), alkyl (e.g. methyl, ethyl, pentyl, dodecyl, octadecyl, 2-ethylhexyl, and the like), aryl (e.g. phenyl, 2-naphthyl, 2-anthracyl, biphenyl, and the like), cycloalkyl (e.g. cyclohexyl, cyclooctyl and the like), alkaryl (e.g. 4-methylphenyl, 2,4-diethylphenyl, 4-dodecylphenyl, and the like), aralkyl (e.g. benzyl, phenylethyl beta-phenyl ethyl, beta-phenyl-propyl, gamma-phenyl-propyl, delta-phenyl butyl, beta-phenylbutyl, ortho-methyl-phenylethyl, 3,5-dimethyl-phenylethyl, para-tertiary-butyl-phenylethyl, para-ethyl-phenylethyl and the like) cycloalkenyl (e.g. cyclohexenyl and the like), alkoxy (such as methoxy, ethoxy, propoxy, dodecyloxy, isopropoxy, and the like), aryloxy (such as phenoxy, napthyloxy, biphenyloxy, and the like), acyloxy (such as acetoxy and the like); and the like.

Illustrative of the substituted monovalent hydrocarbon groups that are represented by Y in Formula I are the alkenyl, cycloalkenyl, alkyl, aryl, aralkyl, alkaryl and cycloalkyl groups having halogen, cyano, isoorganoato, ester (e.g. alkoxy, aryloxy, carbalkoxy, acyloxy and the like), or sulfur- containing (e.g. mercapto, —SH), epoxy and polyoxyalkylene as other substituents. Such Y groups also include the tetrafluoroethyl, trifluorovinyl, chloromethyl, gamma-chloropropyl, beta-cyanoethyl, gamma-cyanopropyl, 4-cyanophenyl, beta-carbethoxyethyl,

MeOOC(CH₂)₁₀— gamma-carbopropoxypropyl, CH₃COOCH₂CH₂—,

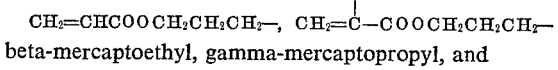

CH₂=CHCOOCH₂CH₂CH₂—, CH₂=C(CH₃)—COOCH₂CH₂CH₂— beta-mercaptoethyl, gamma-mercaptopropyl, and

Cl₃(C₆H₂)SCH₂CH₂— and the like.

Illustrative of the divalent hydrocarbon groups represented by Y in Formula I are the alkylene groups (such as the methylene, ethylene, n-propylene, n-butylene, 2,2-dimethyl-1,3-propylene and decylene groups), the arylene groups (such as the phenylene and p,p'-diphenylene groups), the alkarylene groups (such as the phenylethylene group) and the alkylene-aralkylene groups (such as the sym. —CH₂(C₆H₄)CH₂CH₂— group and the sym. —CH₂C₆H₄CH₂— group). Preferably, the divalent hydrocarbon group is an alkylene group containing from two to four successive carbon atoms.

As stated the application of this invention is not limited to any particular class or type of organopolysiloxane but is broadly applicable to all classes and types such as those covered by the formula:

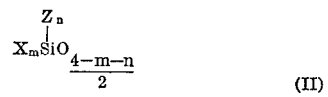

$$X_m \overset{Z_n}{\underset{|}{Si}} O_{\frac{4-m-n}{2}} \qquad (II)$$

wherein X is a group selected from the class consisting of hydrogen, monovalent hydrocarbon groups of 1 to 18 carbon atoms and substituted monovalent hydrocarbon groups of 1 to 18 carbon atoms substituted with a group from the class consisting of mercapto, carboxy, carboalkoxy, alkenyloxy, epoxy, cyano, fluoro, chloro, bromo, polyoxyalkylene, alkoxy and aryloxy groups; Z is a group from the class consisting of —X, and —OX, wherein X is as defined above, $m$ is an integer of 0 to 3, $n$ is an integer of 0 to 3 and $m+n$ is an integer of 1 to 3, X and Z may be the same or different in each unit or in each molecule.

The organopolysiloxanes used herein contain in their molecules —SiO₃, =SiO₂/₂ and ≡SiO₁/₂ units as defined and II or mixtures of two or more such units. These organopolysiloxanes can also contain tetravalent SiO₄/₂ units in addition to the units specified above.

Typical groups represented by X included alkyl (e.g. methyl, ethyl, pentyl, dodecyl, octadecyl, 2-ethylhexyl, and the like), aryl (such as phenyl, 2-naphthyl, 2-anthracyl, biphenyl, and the like), alkaryl (such as 4-methylphenyl, 2,4-diethylphenyl, 4-dodecylphenyl, and the like), aralkyl (such as benzyl, beta-phenylethyl, beta-phenyl-propyl, gamma-phenylpropyl, delta-phenylbutyl, beta-phenylbutyl, ortho-methyl-phenylethyl, 3,5-dimethyl-phenylethyl, para-tertiary-butyl-phenylethyl, para-ethyl-phenylethyl and the like, alkoxy (such as methoxy, ethoxy, propoxy, dodecyloxy, isopropoxy, and the like), aryloxy (such as phenoxy, napthyloxy, biphenyloxy, and the like), acyloxy (such as methacyloxy and the like); also included are substituted alkyl, e.g., beta-cyanoethyl, beta-[(polyoxyethylene)ethoxy]ethyl, beta-phenoxyethyl, beta-phenylethyl, beta-phenyl-n-propyl, 3,3 - dimethyl-n-butyl, 3,3,3-trifluoropropyl, beta-cyanopropyl, gamma-cyanopropyl, gamma - t - butoxypropyl, gamma - cyano-gamma-methyl-n-butyl; cycloalkyl, e.g., cyclopentyl, cyclohexyl, cycloheptyl, alkenyl and substituted alkenyl, e.g., vinyl, alkyl, beta-phenylvinyl, 3-cyclohexenyl; substituted aryl, e.g., 4-cyanophenyl, dibromophenyl; substituted alkaryl, e.g. 4-trifluoromethylphenyl; substituted alkaralkyl such as beta-(trifluoromethylphenyl)ethyl and the like.

Typical hydrolyzable groups represented by Z include alkoxy (such as methoxy, ethoxy, propoxy, dodecyloxy, isopropoxy, and the like), aryloxy (such as phenoxy, napthyloxy, biphenyloxy, and the like), acyloxy (such as acetoxy and the like); and the like.

More specifically, organosiloxanes suitable pursuant to this invention include a broad range of linear and cyclic compounds or mixtures thereof, such as:

(a) linear $R_3Si(OSiR_2)_pOSiR_3$, wherein R is hydrogen or monovalent organic radical such as alkyl, arylalkyl, alkylaryl, alkenyl, alkoxy, acyloxy, or organosiloxy, and wherein $p$ is zero or a positive integer; and (b) cyclic $(R_2SiO)_q$ wherein $q$ is a positive integer greater than 2 ind R is as hereinbefore defined.

Examples of R suitable in the practice of this invention include hydrogen, and organic radicals such as alkyl (e.g., methyl, ethyl, pentyl, dodecyl, octadecyl, 2-ethylhexyl, and the like), aryl (such as phenyl, 2-naphthyl, 2-anthracyl, biphenyl, and the like), alkaryl (such as 4-methylphenyl, 2,4-diethylphenyl, 4-dodecylphenyl, and the like), aralkyl (such as phenyl methyl), alkoxy (such as methoxy, ethoxy, propoxy, dodecyloxy, isopropoxy, and the like), aryloxy (such as phenoxy, naphthyloxy, biphenyloxy, and the like), acyloxy (such as methacyloxy and the like), organosiloxy (such as dimethylsiloxy, trimethylsiloxy and the like) and the like.

More specifically, organosiloxanes suitable pursuant to this invention include linear and cyclic compounds, mixtures thereof, or a member of the group consisting of:

(a) linear $R'_3Si(OSiR'_2)_pOSiR'_3$ wherein R' is hydrogen, a monovalent substituted or unsubstituted hydrocarbon radical having from 1 to 18 carbon atoms and wherein $p$ is zero or a positive integer; and (b) cyclic $(R'_2SiO)_q$, wherein $q$ is a positive integer greater than 2 and R' is as hereinbefore defined.

Examples of R' suitable in the practice of this invention include alkyl (e.g., methyl, ethyl, pentyl, dodecyl, octadecyl, 2-ethylhexyl, and the like), aryl (such as phenyl, 2-naphthyl, 2-anthracyl, biphenyl, and the like), alkaryl (such as 4-methylphenyl, 2,4-diethylphenyl, 4-dodecylphenyl, and the like), aralkyl (such as phenyl methyl) and the like.

Also included as examples of R' are the above-mentioned R' groups having halogen or mercapto groups as a substituent.

The organosiloxanes suitable pursuant to this invention are desirably free of siloxyester bonds, such as silylalkoxy or silylacyloxy, but may contain such units if desired.

As mentioned suitable organosiloxanes pursuant to this invention include extremely broad classes of linear and cyclic organosiloxanes. The organosiloxanes, neat or solvated, desirably contain only trace quantities of the known poisons for the sulfonic acid ion exchange resin such as strongly ionic compounds, radicals containing functional silanic halogens, and strong bases. Siloxane rearrangement is inhibited by undesirably, and relatively, large quantities of these poisons.

There is no limit to the molecular weight of the organosiloxanes useful in this invention, the only practical limitation being the viscosity of the feed mixture so as to permit suitable flow through the resin bed, avoiding high pressure losses across the bed. Viscosity of course may be controlled with proper proportioning of the solvent.

It has been found that feed mixtures of organosiloxanes with viscosities up to about 10,000 cps. were found to give practical results and viscosities above 10,000 cps. are considered but not necessarily inoperable.

The process conditions for carrying out the present invention are not narrowly critical. At atmospheric pressure, the reaction temperature is from about 10° C. to about 100° C. Lower temperatures can be used if desired but without material benefit. Temperatures above 100° C. may be employed if desired, even though the catalyst may degrade somewhat at temperatures above about 150° C. The reaction can be carried out at atmospheric pressure but pressures above and below atmospheric can be used if desired.

Siloxane rearrangement is a reversible process, i.e., low molecular weight organopolysiloxanes are convertible to high polymers and, conversely, high polymer can be reverted to siloxane entities possessing a lower degree of polymerization. Such rearrangements will continue in the presence of a suitable rearrangement catalyst, until an equilibrium mixture of a variety of siloxanes is formed. For example, in systems comprising mainly diorganosiloxy units, with or without triorgano siloxy units, such equilibrium mixtures, in general, contain a relatively minor amount of cyclic siloxanes as well as higher molecular weight linear siloxanes. However, the proportion of cyclic siloxanes in the equilibrium mixture varies from system to system, depending in large part on the nature of organic substituents on the silicon atom of the siloxane being rearranged. So long as materials catalytic to the rearrangement remain in the system, cyclic siloxanes removed from the system create an imbalance in the equilibrium and further rearrangement occurs to strive to replenish the amount of cyclics removed and again achieve an equilibrium. Continued removal of the cyclics will eventually consume most or substantially all of the siloxane in the system. Dilution of the system with a solvent also favors the formation of larger amounts of cyclics in the equilibrium mixture. On the other hand, if the catalyst becomes inactive when the equilibrium mixture is attained or during rearrangement before or after the equilibrium mixture is attained relatively low-boiling materials including cyclics can be removed by solvent extraction, sparging or vacuum stripping without additional formation of cyclics.

High molecular organopolysiloxanes can be depolymerized when solvated. Decreasing the siloxane concentration of a feed, that is by adding a diluent, will result in an increase in the ratio of cyclic restructures to linear restructures. Further with increasing cyclic to linear ratios, the mean average molecular weight of the linear restructured organopolysiloxanes is decreased.

The solvents suitable as diluents pursuant to this process are any inert organic solvents. Typically the solvent selected is dependent upon the organosiloxane employed. Most preferable are the non-hydroscopic type organic solvents including by way of example aromatic hydrocarbons (e.g., xylene, toluene, benzene, naphthalene, and the like) and aliphatic hydrocarbons (e.g., n-hexane, n-octane, n-nonane, n-dodecane, mineral spirits, and the like). Hygroscopic solvents such as ether solvents (e.g., diethyl ether, di-n-butyl ether, tetrahydrofurane, dioxane, and the like), amides (e.g., N,N-dimethylformamide, N, N-dimethylacetamide, and the like), ketones (e.g., acetone dimethyl ketone, methylethyl ketone, methyl isobutyl ketone, and the like), esters (e.g., ethylacetate, isopropylacetate, isobutylacetate, methylpropionate, and the like), and the like may be employed, if suitable drying or desiccating operations are provided.

As mentioned one aspect of this invention relates to rearrangement or more definitively, equilibration of low molecular weight organopolysiloxanes, specifically volatiles, to form higher molecular weight organosiloxanes, such as the oils, gums and resins. The effluent from the reaction zone can be passed to a distillation or fractionation operation to separate out the devolatilized organopolysiloxanes.

Another aspect of this invention relates to rearrangement or more definitively, depolymerization of solvated high molecular weight organopolysiloxanes, to form lower boiling organosiloxanes, such as volatiles and light oils. The effluent from the reaction zone can be passed to a distillation or fractionation operation to separate out the volatiles and/or intermediate boiling fractions.

This invention may readily be practiced on a continuous operating scheme in which the organosiloxane feed mixture, solvated or neat, the temperature of which being maintained by heat exchange apparatus, is passed through an ion-exchange resin bed of horizontal or vertical orientation, wherein siloxane rearrangement occurs. The effluent thereof then passes through chemical separation operations, such as solvent stripping, flash distillation, fractional distillation and/or solvent extraction to separate out the desired product fraction. Thereafter the undesired fractions are recycled into the process cycle for reprocessing. Regeneration of catalyst while allowing processing continuity, when required, may be effected by providing parallel beds with cross-over capability.

In the following examples the macroreticular sulfonic acid exchange resin is Amberlyst 15 (a trademark of Rohm and Haas, Philadelphia, Pa.) and will hereinafter also be referred to as "macroreticular resin." Amberlyst 15 resin has the following relevant characteristics; Typical particle size distribution, Percent retained on:
    16 mesh U.S. Standard Screens _____ 2.4
    —16+20 mesh U.S. Standard Screens _____ 24.2
    —20+30 mesh U.S. Standard Screens _____ 47.9
    —30+40 mesh U.S. Standard Screens _____ 18.8
    —40+50 mesh U.S. Standard Screens _____ 5.7

Through 50 mesh, percent _____ 1.0 max.
Whole bead content, percent _____ 100%.
Moisture, by weight _____ less than 1%.
Solids, by weight _____ 98.5%.
Hydrogen ion concentration:
    meq./g. (dry) _____ 4.9.
    meq./ml. (packed column) ____ 2.9.
Surface area m.$^2$/g. _____ 40 to 50.
Porosity, ml. pore/ml. bead _____ .30 to .35.
Average port diameter, A _____ 200 to 600.
Specific pore volume, cc./gm. _____ .029 to .038.
1.0 max.

In the following examples the following nomenclature is employed therein;
M is $(CH_3)_3SiO_{1/2}$; D is $(CH_3)_2SiO$; D' is $$CH_3(H)SiO$$

T is $CH_3SiO_{3/2}$; Q is $SiO_2$; $D_x$ is the number of D units, as defined hereinbefore, wherein x is zero or an integer greater than zero and relates to linear organosiloxanes, denoted generally as $MD_xM$; and $D_y$ is the number of D units, as defined hereinbefore, wherein y is an integer greater than zero and relates to cyclic organosiloxanes, denoted generally as $D_y$. Residence time is the time the organosiloxanes are in contact with the catalyst and are determined by;

$$\text{resid. time} = \frac{\text{volumetric flow rate}}{\text{packed bed volume}}$$

Equivalent time is the time the organosiloxanes are in contact with one milliequivalent of H+. Meq. is milliequivalents of H+. Control conditions refer to a four hour catalysis at 25° C. with two percent equivalent $H_2SO_4$ (based on the weight of the organosiloxanes) unless otherwise specified. Viscosity is a standard Ostwald viscometric measurement at 25° C. and is reported in centistokes (cstks.). All composition analyses in the examples are vapor phase chromatographic analyses.

EXAMPLE 1

Six grams of macroreticular resin was added to a flask containing 50 grams of a neutralized hydrolyzate of dimethyldichlorosilane. The siloxane mixture is designated as consisting essentially of $D_y$ and $HOD_xH$ as shown in Table I. This mixture was agitated for 1 hour at 68° C. The mixture was then filtered from the resin using a stainless steel Kruger pressure filter having an asbestos pad.

Table I compares the product and feed siloxane compositions in percent by weight and viscosities in centistokes (cstks.).

TABLE I

|  | Feed | Product |
|---|---|---|
| Viscosity | 29.1 | 4,176 |
| Hexamethylcyclotrisiloxane (D₃) | 0.2 | (¹) |
| Octamethylcyclotetrasiloxane (D₄) | 34.5 | 5.1 |
| Decamethylcyclopentasiloxane (D₅) | 9.1 | 3.8 |
| Dodecamethylcyclohexasiloxane (D₆) | 2.1 | 1.4 |

¹ Not detected.

A second feed mixture, prepared in the identical manner, was added to a flask containing 44 grams of Dowex 50W–X8 (a trademark of Dow Chemical Co.), a gel-type sulfonic acid ion exchange resin. The mixture was agitated for 16 hours at 65° C. Thereafter an analysis indicated no change in the feed mixture.

EXAMPLE 2

A portion of a mixture of 1984 grams of cyclics, $D_y$, and 496 grams of linear, MM, was passed through a 20 mm. (diameter) x 300 mm. (length) column packed with 30 cc. of macroreticular resin at 41° C. Samples of effluent were taken and analyses thereof are reported by percent weight in Table II. The column was discharged, cleaned and recharged with 30 cc. of a gel-type resin, Amberlite IR 120 (a trademark of Rohm and Haas, Phila. Pa.) (5.0 meq. H+, 0.8% H₂O). The residual portion of the prepared mixture was passed through the column at 41° C. and a sample of the effluent was analyzed and shown by comparison in Table II.

TABLE II

|  | Feed | Product Amberlyst 15 |  |  |  | Amberlite IR 120 (H) |
|---|---|---|---|---|---|---|
| Residence time (min.) |  | 13 | 11.5 | 10.0 | 60.0 | 18 |
| Equivalent time (min.) |  | 1.2 | 0.98 | 0.85 | 5.1 | 2.3 |
| Viscosity (cstks.) | 1.4 | 6.4 | 6.4 | 6.4 | 6.5 | 1.4 |
| Percent by weight: |  |  |  |  |  |  |
| D₃ | 11.3 |  |  |  |  | 11.5 |
| D₄ | 66.2 | 4.4 | 3.8 | 3.9 | 3.9 | 65.2 |
| D₅ | 0.9 | 2.5 | 2.3 | 2.1 | 2.3 | 0.9 |
| D₆ |  | 0.6 | 0.6 | 0.6 | 0.6 |  |
| MM | 21.4 | 2.0 | 2.0 | 1.9 | 1.9 | 20.6 |
| MDM |  | 3.2 | 3.4 | 3.2 | 3.2 | 0.1 |
| MD₂M |  | 3.7 | 3.9 | 3.8 | 3.7 | 0.1 |
| MD₃M |  | 4.0 | 4.0 | 3.8 | 4.1 |  |
| MD₄M |  | 4.0 | 4.0 | 4.1 | 4.0 |  |
| MD₅M |  | 3.9 | 4.0 | 3.9 | 4.0 |  |
| Higher Mw components |  | 72.1 | 72.0 | 72.5 | 72.3 | 1.5 |

EXAMPLE 3

A mixture of hexamethyldisiloxane and dimethylsiloxane cyclic compounds was passed at a flow rate of 0.35 cc./minute (residence time 25 minutes) through a column packed with 11 grams Amberlyst 15. Water at 86° C. was circulated through a jacket on the outside of the column. A comparison of properties of the product with those of the feed mixture in terms of percent by weight, is shown in the table below.

|  | Feed | Product |
|---|---|---|
| Hexamethylcyclotrisiloxane (D₃) | 2.8 | (¹) |
| Octamethylcyclotetrasiloxane (D₄) | 16.2 | 5.4 |
| Decamethylcyclopentasiloxane (D₅) | (¹) | 4.9 |
| Dodecamethylcyclohexasiloxane (D₆) |  | 3.3 |
| Tetradecamethylcycloheptasiloxane (D₇) |  | 1.8 |
| Hexamethyldisiloxane (MM) | 68.0 | 37.6 |
| Octamethyltrisiloxane (MDM) | 2.4 | 23.3 |
| Decamethyltetrasiloxane (MD₂M) | 1.1 | 11.2 |
| Dodecamethylpentasiloxane (MD₃M) |  | 5.2 |
| Tetradecamethylhexasiloxane (MD₄M) |  | 2.4 |
| Components having longer VPC retention | 9.5 | 1.0 |

¹ Not detected.

In Examples 4 and 5, mixtures of MM and $D_y$ were passed through a packed column as described in Example 3, under several reaction conditions as denoted below. All percentage values are given as percent by weight.

EXAMPLE 4

[Feed: MM, 15 grams; $D_y$, 2,985 grams.]

| Reaction conditions | | Product properties | | | | |
|---|---|---|---|---|---|---|
| Time | Temperature, °C. | Percent by weight | | | | Viscosity (cstks.) |
| | | $D_4$ | $D_5$ | $MD_2M$ | $MD_3M$ | |
| 30 min | 60 | 6.2 | 3.9 | ND | ND | 1,599 |
| 65 min | 60 | 6.1 | 3.8 | ND | ND | 1,995 |
| 130 | 60 | 5.7 | 3.9 | ND | ND | 2,110 |
| Control | | | | | | |
| 4 hr | 25 | 5.1 | 3.7 | ND | ND | 1,938 |

NOTE.—ND = none detected.

EXAMPLE 5

[Feed: MM, 210 grams; $D_y$, 8,790 grams.]

| Reaction conditions | | Product |
|---|---|---|
| Time, minutes | Temperature, (° C.) | Viscosity (cstks.) |
| 3 | 30 | 12 |
| 4 | 30 | 19 |
| 8.5 | 30 | 50 |
| 13 | 30 | 79 |
| 67 | 30 | 137 |

EXAMPLE 6

This example shows the ability to prepare high viscosity silicone fluids in the presence of a non-reactive diluting solvent.

A mixture of MM (7.5 grams), $D_y$ (1493 grams) and hexane (355 grams) was passed through a 30 mm. x 800 column packed with 250 cc. Amberlyst 15 at 60° C. and 45 minutes residence time. The resulting fluid had a viscosity of $8 \times 10^3$ centistokes. After devolatilization to 220° C. at atmospheric pressure the viscosity was $89 \times 10^3$ cstks.

EXAMPLE 7

This example shows the ability of a macroreticular resin to rearrange methyl hydrogen siloxane bonds and prepare dimethylsiloxane - methyl - hydrogensiloxane copolymers.

A mixture consisting of: 166 grams of trimethylsiloxy terminated methylhydrogenpolysiloxane, viscosity of 30 centistokes (Union Carbide Silicone L–31); 55 grams of MM; and 435 grams of $D_y$ was passed through a column packed with macroreticular resin (11 grams).

A 100 gram sample of the above feed mixture was stirred with 2 grams of concentrated sulfuric acid at room temperature and then neutralized with sodium bicarbonate and filtered. A comparison of the samples taken from the ion exchange column, the sample treated with sulfuric acid, and the feed mixture is shown in the table below.

| | Feed | Product | |
|---|---|---|---|
| | | $H_2SO_4$ | Amberlyst 15 |
| Residence time, hrs | | 4.0 | .03 |
| Temperature, °C | | 25±2 | 25±2 |
| Viscosity (centistokes) | (¹) | (¹) | 14.3 |
| Percent by weight: | | | |
| Hexamethyldisiloxane (MM) | 11.0 | 0.4 | 0.4 |
| Hexamethylcyclotrisiloxane ($D_3$) | 9.1 | | |
| Octamethylcyclotetrasiloxane ($D_4$) | 57.8 | 2.9 | 1.4 |
| Sym. heptamethyltrisiloxane (MD'M) | | 0.3 | 0.4 |
| Higher mol. wt. species | 22.1 | 96.4 | 97.9 |

¹ Not determined.

Examples 8 through 10 show the preparation of methyl-hydrogen - siloxane - dimethylsiloxane copolymers by macroreticular resin siloxane rearrangement.

Mixures of $MD'_xM$, $D_y$ and MM were passed through a 24" x 1" mm. glass column which contained 250 cc. of the macroreticular resin.

The feed mixtures were also treated with 2 weight percent sulfuric acid for 4 hours at 25° C. The properties of the sulfuric acid treated samples are shown as "control" samples.

EXAMPLE 8

| Feed, grams | Analyzed feed composition (percentages are by weight) |
|---|---|
| MM | 412    8.7%. |
| $MD'_xM$ | 974 |
| $D_y$ | 3,285    y=3, 9.8%, y=4, 62.3%, y=5, 1.1%. |
| Viscosity | 4.4 centistokes. |

| Reaction conditions | | Product properties | | |
|---|---|---|---|---|
| Time | Temperature | Percent by weight | | Viscosity (cstks.) |
| | | MM | $D_4$ | |
| 31 min | 25 | 0.4 | 1.6 | 16.5 |
| 14 min | 25 | 0.4 | 1.8 | 16.4 |
| 23 min | 25 | | | 16.7 |
| Control | | | | |
| 4 hours | 25 | 0.4 | 1.7 | 15.8 |

EXAMPLE 9

[Feed: MM, 124 grams; $MD'_xM$, 250 grams; $D_y$, 4,611 grams; Viscosity, 2.4 centistokes.]

| Reaction conditions | | Product properties | | |
|---|---|---|---|---|
| Time | Temperature | Percent by weight | | Viscosity (cstks.) |
| | | $D'D_3$ | $D_4$ | |
| 12 min | 25 | 0.5 | 9.9 | 60.5 |
| 37 min | 25 | 0.9 | 4.1 | 84.3 |
| 30 min | 25 | 0.8 | 4.6 | 79.3 |
| Control | | | | |
| 4 hours | 25 | 0.9 | 4.5 | 76.4 |

EXAMPLE 10

[Feed: MM, 1,620 grams; $MD'_xM$, 600 grams; $D_y$, 0 grams.]

| Time | Temperature | MM | MD'M | $MD'_2M$ | $MD'_3M$ |
|---|---|---|---|---|---|
| 4 min | 25 | 41.9 | 27.0 | 12.3 | 5.0 |
| 8.5 min | 25 | 37.1 | 30.9 | 16.1 | 6.8 |
| Control | | | | | |
| 4 hours | 25 | 36.2 | 30.3 | 18.1 | 7.8 |

Examples 11 and 2 show Amberlyst 15 to be operable for rearrangement of diphenylsiloxane bonds. Further shown is the ability to produce low molecular weight cyclic structures from high molecular weight linear structures.

EXAMPLE 11

A toluene solution of 193 grams of neutral hydrolyzate of diphenyldichlorosilane, 78 grams of neutral devolatilized hydrolyzate of dimethyl dichlorosilane, and sufficient toluene to dilute the system to 20 percent by weight organosiloxane, was mixed and fed through a column packed with 250 cc. of Amberlyst 15 at the conditions shown below.

| | Analyzed composition of feed mixture (percent by weight) | | | | |
|---|---|---|---|---|---|
| | Toluene | $D_4$ | $D_5$ | $D_7$ | High Mw silicone |
| Mixture | 80.1 | 0.2 | 0.2 | 0.1 | 19.4 |
| Normalized: | | | | | |
| Composition of organosiloxanes | | 1 | 1 | 0.5 | 97.5 |

| Reaction conditions | | | | | | | | | | |
|---|---|---|---|---|---|---|---|---|---|---|
| Time, min. | Temperature °C. | Toluene | $D_4$ | $D_5$ | $D_6$ | $D_7$ | $D''D_3$ | $D''D_4$ | $D''D_5$ | |
| 56 | 60 | 77.5 | 3.0 | 1.4 | 0.4 | 0.1 | 0.3 | 0.2 | 0.1 | 17.0 |
| | | (¹) | 13 | 6 | 2 | 0.5 | 1.5 | 1 | 0.5 | 75 |

¹ Normalized composition of organosiloxanes.
NOTE.—$D''$=diphenylsiloxane.

EXAMPLE 12

A high molecular weight devolatized silicone gumstock containing about 15 percent by weight diphenylsiloxy units and 85 percent by weight $(CH_3)_2SiO$ units (20 grams), 80 grams of toluene and 100 cc. of Amberlyst were agitated 24 hours at room temperature. Properties of the product are tabulated below.

| | Product (percent by weight) | | | | | | | | |
|---|---|---|---|---|---|---|---|---|---|
| Toluene | $D_3$ | $D_4$ | $D_5$ | $D_6$ | $D_7$ | $D_4$ | $D''D_3$ | $D''D_4$ | $D''D_5$ |
| 87 | | 0.1 | 6.2 | 3.1 | 0.9 | 0.3 | 0.1 | 1.1 | 0.7 | 0.2 |
| Normalized composition of organosiloxanes | 0.8 | 47.7 | 23.9 | 6.9 | 2.4 | 0.8 | 8.5 | 5.4 | 1.7 |

EXAMPLE 13

An aliquot of 47 grams of a mixture of 20 grams of tetraethylorthosilicate and 450 grams of dimethylsilicone cyclics (98 percent cyclic tetramer) was charged to a 100 cc. flask. The flask was equipped with a mechanical agitator and a nitrogen by-pass on the vent. The flask was heated to 80° C. and the temperature was thermostatically controlled at 80°–90° C. One gram of Amberlyst 15 was added while agitation continued. Samples were drawn from the flask periodically and analyzed for percent tetraethylorthosilicate. At 11.25 hours the tetraethylorthosilicate had decreased to 1.2 percent from the initial 4.7 percent.

The residuum of the above-prepared mixture was separated into aliquots and passed through a 10 mm. x 80 mm. column packed with 60 cc. of Amberlyst 15 at varying residence times. The mixture was maintained at 27° C. At a residence time of 14 minutes, the tetraethylorthosilicate analysis showed 0.2 percent present. At a residence time of 38 minutes, no tetraethylorthosilicate was detected.

EXAMPLE 14

A mixture of 1458 grams of tetraethoxysilane and 455 grams of hexamethyldisiloxane were passed through a ¾ inch x 36 inch column packed with 230 cc. of ethanol wet Amberlyst 15 at a residence time of 32 minutes. The resulting product contained:

Percent by weight
Hexamethyldisiloxane _____ 1.0
Trimethylethoxysilane _____ 16.0
1,1,1-trimethyl-3,3,3-triethoxydisiloxane _____ 28.7
1,1,1,5,5,5-hexamethyl-3,3-diethoxytrisiloxane _____ 2.3
Tetraethoxysilane _____ 49.0

Examples 15 and 16 of Amberlyst 15 to rearrange phenylalkyl siloxanes and the preparation of phenyl alkyl- (methyl) siloxane-dimethylsiloxane-methylhydrogen siloxane copolymers.

EXAMPLE 15

A mixture of 30.1 grams of MM, 898 grams of $D_y$, 67.9 grams of trimethylsiloxy terminated methylhydrogensiloxane fluid, and 643.4 grams of neutral hydrolyzate of β-phenylpropyl (methyl)dichlorosilane having a viscosity of 25 centistokes was passed through an 30 mm. diam. x 800 mm. length column packed with 250 cc. Amberlyst 15, at 25° C. resulting in 5.5 hours residence time at equilibrium. The resulting fluid had a terminal viscosity of 150 centistokes.

EXAMPLE 16

A mixture of 13 grams of trimethylsiloxy terminated methylhydrogensiloxane fluid (viscosity 30 centistokes) and trimethylsiloxy terminated β-phenylethyl(methyl)siloxanedimethylsiloxane fluid (viscosity, 375 centistokes) was passed through 30 mm. (diam.) x 800 mm. (length) column packed with 250 cc. Amberlyst 15 at room temperature and 5 hour residence time. The resulting fluid had a viscosity of 545 centistokes.

EXAMPLE 17

This example demonstrates the ability to produce nonequilibrium organopolysiloxane distributions by mechanically controlling residence time.

A mixture of 110 grams of hexamethyldisiloxane and 620 grams of octamethylcyclotetrasiloxane was passed through a column packed with 11 grams of Amberlyst 15. Samples were taken at different contact times and temperatures.

A 100 gram sample of the above feed mixture was stirred with 2 grams of sulfuric acid for 4 hours then neutralized with sodium bicarbonate and filtered. This sample is termed "control."

A comparison of the starting mixture, the samples taken from the Amberlyst 15 column, and the sulfuric acid treated material is shown in the table below.

| Catalyst | Feed | Control ($H_2SO_4$) | Product (Amberlyst 15) | | | | | |
|---|---|---|---|---|---|---|---|---|
| Residence time (min.) | | 240 | 0.4 | 1.4 | 4.7 | 8.8 | 3.2 | 12 |
| Temperature °C. | | 26±2 | 85 | 85 | 85 | 85 | 25±2 | 25±2 |
| Viscosity (cstks.) | 1.7 | 5.5 | 5.5 | 5.5 | 8.4 | 9.2 | 4.2 | 8.6 |
| Percent by weight: | | | | | | | | |
| $D_3$ | | Trace | 0.1 | Trace | 0.1 | 0.1 | Trace | Trace |
| $D_4$ | 79.8 | 5.0 | 44.8 | 25.6 | 8.8 | 5.3 | 34.3 | 7.5 |
| $D_5$ | 0.7 | 2.3 | 2.2 | 3.1 | 3.1 | 3.0 | 2.1 | 2.9 |
| $D_6$ | 0.9 | 0.5 | 0.8 | 0.8 | 0.8 | 0.8 | 0.5 | 0.9 |
| $D_7$ | | 0.2 | 0.2 | 0.2 | 0.2 | 0.2 | 0.2 | 0.1 |
| $D_8$ | | 0.1 | 0.1 | 0.1 | 0.1 | 0.1 | 0.1 | 0.1 |
| $D_9$ | | Trace | Trace | Trace | 0.1 | Trace | Trace | Trace |
| MM | 19.5 | 0.9 | 2.9 | 1.7 | 1.3 | 1.3 | 1.7 | 1.3 |
| MDM | | 1.7 | 2.1 | 2.0 | 2.0 | 2.0 | 2.1 | 1.9 |
| $MD_2M$ | | 2.2 | 2.3 | 2.4 | 2.4 | 2.4 | 2.3 | 2.3 |
| $MD_3M$ | | 2.4 | 2.8 | 2.9 | 2.5 | 2.7 | 2.7 | 1.3 |
| $MD_4M$ | | 4.7 | 11.5 | 7.6 | 3.6 | 3.0 | 8.6 | 3.4 |
| $MD_5M$ | | 2.8 | 3.0 | 1.6 | 2.9 | 2.8 | 2.9 | 2.9 |
| $MD_6M$ | | 3.1 | 2.4 | 2.9 | 2.8 | 2.8 | 2.6 | 3.1 |
| $MD_7M$ | | 2.8 | 2.4 | 2.9 | 2.9 | 2.8 | 2.5 | 2.9 |
| $MD_8M$ | | 3.2 | 3.0 | 3.0 | 2.8 | 2.8 | 2.8 | 2.9 |
| $MD_9$ | | 2.6 | 1.8 | 2.3 | 2.4 | 2.6 | 1.0 | 3.1 |
| $MD_{10}M$ | | 2.4 | 1.5 | 2.3 | 2.2 | 2.4 | 1.7 | 2.6 |
| $MD_{11}M$ | | 2.1 | 1.4 | 2.0 | 2.0 | 2.4 | 2.3 | 1.6 |
| $MD_{12}M$ | | 1.9 | 1.3 | 1.9 | 1.7 | 1.8 | 1.4 | 2.9 |
| $MD_{13}M$ | | 1.6 | 1.0 | 1.6 | 1.5 | 1.7 | 2.1 | 1.2 |
| $MD_{14}M$ | | 1.6 | 0.9 | 1.4 | 1.3 | 1.9 | 1.0 | 2.6 |
| $MD_{15}M$ | | 1.2 | 0.8 | 1.3 | 1.2 | | 1.2 | 1.6 |
| $MD_{16}M$ | | 1.1 | 0.6 | 1.0 | 1.0 | | 0.9 | 2.2 |

EXAMPLE 18

This example shows the preparation of dimethyl siloxane fluids on a production scale.

A mixture of 992 pounds of dimethylsilicone cyclics and 7 pounds of hexamethyldisiloxane was fed at 80° C., to an 18 inch (diameter) x 8 foot (length) stainless steel column packed to a depth of 5 feet with Amberlyst 15 resin, at a rate of 175 pounds per hour. The effluent from the column had a viscosity of 1300 centistokes, and contained 9.5 percent by weight of dimethylsiloxane cyclics.

What is claimed is:

1. A process for siloxane bond rearrangement of organosiloxanes which comprises:
    flowing an organosiloxane feed at a temperature from about 10° C. to about 100° C. through a packed bed containing a macroreticular sulfonic acid cation exchange resin having an average pore volume of at least about 0.01 cubic centimeters per gram and thereafter recovering effluent organosiloxanes.
2. The process of claim 1 wherein high molecular weight organopolysiloxane is depolymerized.
3. The process of claim 1 wherein low molecular weight organopolysiloxane is equilibrated.
4. The process of claim 2 wherein the high molecular weight organosiloxane is solvated.
5. The process of claim 4 wherein the solvent is an aliphatic hydrocarbon.
6. The process of claim 4 wherein the solvent is an aromatic hydrocarbon.
7. The process of claim 3 wherein the low molecular weight organosiloxane is solvated.
8. The process of claim 1 wherein the organopolysiloxane effluent is in a chemical bond equilibrium.
9. The process of claim 1 wherein the average pore volume is at least about 0.03 cubic centimeters per gram.
10. The process of claim 1 wherein the rearrangement temperature is from about 25° C. to about 60° C.
11. The process of claim 1 wherein the viscosity of the feed organosiloxane is up to about 10,000 centipoises.
12. The process of claim 1 wherein the resin has an average surface area of from about 40 to 50 square meters per gram.
13. The process of claim 1 wherein the organosiloxane feed is a mixture of organosiloxanes.
14. The process of claim 13 wherein the mixture comprises:
    hexamethyl disiloxane and
    dimethyl siloxane.
15. The process of claim 13 wherein the mixture comprises:
    methyl hydrogen siloxane;
    dimethyl siloxane; and
    an organosiloxane selected from the group consisting of hexamethyldisiloxane and sym-tetramethyldisiloxane.
16. A continuous process for effecting siloxane bond rearrangement or organosiloxanes which steps in combination thereof comprise:
    flowing an organosiloxane at a temperature of from 10° C. to about 100° C. through a packed bed containing a macroreticular resin having an average pore volume of at least about 0.01 cubic centimeters per gram;
    recovering the effluent organosiloxanes;
    separating a desired boiling fraction from the effluent; and
    recycling an undesired boiling fraction to the organosiloxane feed flow.
17. Claim 16 wherein the organosiloxane feed flow is solvated.

References Cited

UNITED STATES PATENTS

| | | | |
|---|---|---|---|
| 3,322,722 | 5/1967 | Eynon | 260—46.5 |
| 3,309,390 | 3/1967 | Omietanski | 260—448.2 |
| 2,831,008 | 4/1958 | Knopf et al. | 260—448.2 |

OTHER REFERENCES

Patnode et al., "Methyl Polysiloxanes," vol. 68, Journal of the American Chemical Society, pp. 358 to 363, March 1946.

DONALD E. CZAJA, Primary Examiner

M. I. MARQUIS, Assistant Examiner

U.S. Cl. X.R.

260—2.2 R, 46.5 G, 448.2 E